United States Patent
Jindal et al.

(10) Patent No.: US 9,926,458 B2
(45) Date of Patent: *Mar. 27, 2018

(54) POLY(VINYL ALCOHOL)-CONTAINING AND SILICA NANOPARTICLE MULTILAYER COATINGS AND METHODS

(71) Applicant: 3M INNOVATIVE PROPERTIES COMPANY, St. Paul, MN (US)

(72) Inventors: Karan Jindal, Woodbury, MN (US); Justin A. Riddle, St. Paul, MN (US); Paul B. Armstrong, Minneapolis, MN (US); Samuel J. Carpenter, St. Paul, MN (US); William R. Dudley, Seabring, FL (US); Garry W. Lachmansingh, Plymouth, MN (US); Jason T. Petrin, Woodbury, MN (US); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/893,262

(22) PCT Filed: Apr. 25, 2014

(86) PCT No.: PCT/US2014/035394
§ 371 (c)(1),
(2) Date: Nov. 23, 2015

(87) PCT Pub. No.: WO2014/193571
PCT Pub. Date: Dec. 4, 2014

(65) Prior Publication Data
US 2016/0096969 A1    Apr. 7, 2016

Related U.S. Application Data

(60) Provisional application No. 61/828,837, filed on May 30, 2013.

(51) Int. Cl.
C09D 129/04    (2006.01)
B05D 3/02    (2006.01)
(Continued)

(52) U.S. Cl.
CPC ......... *C09D 129/04* (2013.01); *B05D 3/0272* (2013.01); *B05D 7/542* (2013.01);
(Continued)

(58) Field of Classification Search
CPC ...... C08J 7/045; C09D 5/1618; C09D 5/1693; C09D 129/04; C08K 3/36
See application file for complete search history.

(56) References Cited

U.S. PATENT DOCUMENTS 2,761,419 A    9/1956    Mercier
3,692,725 A    9/1972    Duchane
(Continued)

FOREIGN PATENT DOCUMENTS

CN    101579672    11/2009
CN    101747690    6/2010
(Continued)

OTHER PUBLICATIONS

Martens, "Characterization of hydrogels formed from acrylate modified poly(vinyl alcohol) macromers", Polymer, 2000, vol. 41, No. 21, pp. 7715-7722.
(Continued)

*Primary Examiner* — Hai Vo
(74) *Attorney, Agent, or Firm* — Adrian L. Pishko (57) ABSTRACT

Articles having poly(vinyl alcohol)-containing (PVA-containing) and silica nanoparticle multilayer coatings are provided. More specifically, articles include a substrate and a multilayer coating attached to the substrate. The multilayer coating includes a first silica layer and a first PVA-containing layer. The first silica layer is a primer layer of the
(Continued)

multilayer coating, and the silica layer comprises a plurality of acid-sintered interconnected silica nanoparticles arranged to form a continuous three-dimensional porous network. The PVA-containing and silica nanoparticle multilayer coatings can be used on a large variety of substrates and tend to be resistant to wet and dry abrasions, scratches, and impacts.

20 Claims, 2 Drawing Sheets

(51) Int. Cl.

| | |
|---|---|
| B05D 7/00 | (2006.01) |
| C08J 7/04 | (2006.01) |
| C09D 5/16 | (2006.01) |
| C03C 17/34 | (2006.01) |
| C09D 5/00 | (2006.01) |
| C09D 7/12 | (2006.01) |

(52) U.S. Cl.
CPC ............ B05D 7/582 (2013.01); B05D 7/5823 (2013.01); C03C 17/34 (2013.01); C08J 7/045 (2013.01); C09D 5/00 (2013.01); C09D 5/1618 (2013.01); C09D 5/1693 (2013.01); C09D 7/12 (2013.01); C03C 2217/425 (2013.01); C03C 2217/734 (2013.01)

(56) References Cited

U.S. PATENT DOCUMENTS

| | | | |
|---|---|---|---|
| 4,127,682 A | | 11/1978 | Laurin |
| 4,478,909 A | * | 10/1984 | Taniguchi ........ B29D 11/00865 428/331 |
| 4,567,221 A | | 1/1986 | Maruyama |
| 4,758,547 A | | 7/1988 | Itabashi |
| 4,859,717 A | | 8/1989 | Hoskin |
| 5,134,021 A | | 7/1992 | Hosono |
| 5,147,344 A | | 9/1992 | Sachau |
| 5,221,497 A | | 6/1993 | Watanabe |
| 5,677,050 A | | 10/1997 | Bilkadi |
| 6,007,874 A | | 12/1999 | Bhave |
| 6,040,053 A | | 3/2000 | Scholz |
| 6,432,516 B1 | | 8/2002 | Terasaki |
| 7,723,424 B2 | | 5/2010 | Hashemzadeh |
| 2003/0047111 A1 | | 3/2003 | Niume |
| 2008/0248287 A1 | | 10/2008 | Illsley |
| 2010/0035039 A1 | | 2/2010 | Jing |
| 2010/0062117 A1 | | 3/2010 | Illsley |
| 2011/0033694 A1 | | 2/2011 | Jing |
| 2012/0028005 A1 | | 2/2012 | Zheng |
| 2013/0040126 A1 | * | 2/2013 | Pett ......................... C09D 1/00 428/312.6 |
| 2013/0224478 A1 | | 8/2013 | Jing |
| 2016/0121365 A1 | * | 5/2016 | Armstrong ............... C09D 1/00 427/243 |

FOREIGN PATENT DOCUMENTS

| | | |
|---|---|---|
| EP | 0 437 902 | 7/1991 |
| EP | 0662102 | 7/1995 |
| EP | 0770658 | 5/1997 |
| WO | WO 2009-140482 | 11/2009 |
| WO | WO 2010/062893 | 6/2010 |
| WO | WO 2010-114698 | 10/2010 |
| WO | WO 2010-114700 | 10/2010 |
| WO | WO 2011-084661 | 7/2011 |
| WO | WO 2011-137005 | 11/2011 |
| WO | WO 2011-139573 | 11/2011 |
| WO | WO 2012-047422 | 4/2012 |
| WO | WO 2012-064646 | 5/2012 |
| WO | WO 2012-173803 | 12/2012 |
| WO | WO 2014-193572 | 12/2014 |
| WO | WO 2014-193573 | 12/2014 |

OTHER PUBLICATIONS

Uragami, "Studies on Syntheses and Permeabilities of Special Polymer Membranes", Die Angewandte Makromolekulare Chemie, 1986, vol. 138, pp. 173-183.

Bragg, "The Form Birefringence of Macromolecules", Acta Crystallographica, 1953, vol. 6, pp. 865-867.

International Search report for PCT International Application No. PCT/US2014/035394 dated Aug. 27, 2014, 4 pages.

U.S. Appl. No. 14/893232, "Poly(Vinyl Alcohol) and Silica Nanoparticle Multilayer Coatings and Methods," filed Nov. 23, 2015 (WO 2014/193572).

U.S. Appl. No. 14/893248, "Crosslinked Poly(Vinyl Alcohol) and Silica Nanoparticle Multilayer Coatings and Methods," filed Nov. 23, 2015 (WO 2014/193573).

* cited by examiner

POLY(VINYL ALCOHOL)-CONTAINING AND SILICA NANOPARTICLE MULTILAYER COATINGS AND METHODS

CROSS REFERENCE TO RELATED APPLICATIONS

This application is a national stage filing under 35 U.S.C. 371 of PCT/US2014/035394, filed Apr. 25, 2014, which claims priority to U.S. Application No. 61/828,837, filed May 30, 2013, the disclosure of which is incorporated by reference in its/their entirety herein.

FIELD

Articles and methods of making articles having poly(vinyl alcohol)-containing and silica nanoparticle multilayer coatings are provided.

BACKGROUND

Acid-sintered nanosilica coatings have been prepared by acidifying an aqueous colloidal suspension of nanometer-scale particles to a pH of less than 5, for example 2-3. Such silica nanoparticle coatings include those, for example, described in co-owned U.S. Patent Application Publication Nos. 2011/0033694 (Jing et al.) and 2010/0035039 (Jing et al.) and in co-owned International Application Publication Nos. WO 2012/064646 (Riddle et al.), WO 2011/139573 (Pett et al.), and WO 2012/047422 (Hebrink et al.). At a pH of 2-3, the particles possess little or no net charge, and can thus aggregate and fuse. Upon drying, the particles sinter at temperatures much lower than would be required without acidification. The result is a hard, porous, and hydrophilic coating that can be applied to various substrates. Dry dirt and dust exhibits reduced adhesion to nanosilica-coated surfaces relative to common glass or polymeric substrates, plus the nanosilica-coated surfaces have anti-fogging and anti-soiling properties. While acid-sintered nanosilica coatings have been shown to be acceptably stable to moisture and UV light, they do not possess sufficient impact and/or abrasion resistance for some applications.

SUMMARY

Articles having a substrate and a multilayer coating attached to the substrate are provided. More specifically, the multilayer coating includes a first silica layer and a first PVA-containing layer. The first silica layer is a primer layer of the multilayer coating, and the silica layer comprises a plurality of acid-sintered interconnected silica nanoparticles arranged to form a continuous three-dimensional porous network. The multilayer coatings can be used on a large variety of substrates and tend to be resistant to wet and dry abrasions, scratches, and impacts.

In a first aspect, an article is provided that includes (a) a substrate and (b) a multilayer coating attached to the substrate. The multilayer coating includes (i) a first silica layer that is a primer layer of the multilayer coating directly attached to the substrate, and (ii) a first PVA-containing layer disposed directly adjacent to the first silica layer. The first PVA-containing layer includes between 10 weight percent and 100 weight percent poly(vinyl alcohol) (PVA). The first silica layer comprises a plurality of acid-sintered interconnected silica nanoparticles arranged to form a continuous three-dimensional porous network.

In a second aspect, a method of making an article is provided. The method includes (a) providing a substrate and (b) attaching a multilayer coating to the substrate. The attaching includes (i) forming a first silica layer that is a primer layer of the multilayer coating directly attached to the substrate, and (ii) forming a first PVA-containing layer directly adjacent to the first silica layer, the first PVA-containing layer comprising between 10 weight percent and 100 weight percent PVA. Optionally, the method includes slide coating.

While the above-identified drawings, which may not be drawn to scale, set forth various embodiments of the present disclosure, other embodiments are also contemplated, as noted in the Detailed Description.

DETAILED DESCRIPTION

Articles having a multilayer coating attached to a substrate are provided. More specifically, the multilayer coating includes a first silica layer and a first PVA-containing layer. The first silica layer is a primer layer of the multilayer coating, and the silica layer comprises a plurality of acid-sintered interconnected silica nanoparticles arranged to form a continuous three-dimensional porous network. The multilayer coatings can be used on a large variety of substrates and tend to be resistant to wet and dry abrasions, scratches, and impacts.

The recitation of any numerical range by endpoints is meant to include the endpoints of the range, all numbers within the range, and any narrower range within the stated range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example, the expression "A and/or B" means A, B, or a combination of A and B.

The term "coating composition" refers to a solution or dispersion including components (e.g., PVA, silica nanoparticles, solvent, additives, etc.) suitable for applying onto a major surface of a substrate as a coating, onto another coating composition present on a substrate, or onto a layer present on a substrate.

The term "layer" refers to a coating composition that has been applied onto a major surface of a substrate or onto another layer on a substrate, and refers to the components remaining after a drying process.

The term "fluid layer" refers to a coating composition that has been applied onto a surface, for example onto a major surface of a substrate or onto another fluid layer on a substrate, prior to being subjected to a drying process.

The term "outermost layer" refers to the uppermost layer of a multilayer coating, i.e., the layer furthest from a major surface of a substrate on which the multilayer coating is applied.

The term "PVA" refers to poly(vinyl alcohol), derivatives thereof, and mixtures of poly(vinyl alcohol) and its derivatives. The degree of hydrolysis of PVA or its derivatives is from 50 to 100 percent, or 70 to 100 percent, or 85 to 100 percent. For example, the PVA can include up to 50 percent polyvinyl acetate.

The term "crosslinked PVA" refers to PVA that has been crosslinked by any suitable means, including the use of crosslinking agents.

The term "acid-sintered silica nanoparticles" means silica nanoparticles that have been subjected to an acid having a pKa less than 3.5 to a pH, such that a dispersion of the silica nanoparticles has a pH in a range of 2 to 5. Typically, thermal sintering of silica requires temperatures of about 70% of the melting point temperature of about 1400-1700° C.; however, the acid-sintered silica nanoparticles are instead chemically sintered by the acid. Optionally, the acid-sintered silica nanoparticles are also exposed to temperatures as high as about 120° C. during drying/curing processes for a coated article.

The term "silica layer" refers to a layer comprising 75% by weight or more silica nanoparticles of the layer. The silica nanoparticles are preferably acid-sintered silica nanoparticles, however, the silica nanoparticles are not required to be acid-sintered.

The term "intermediary layer" refers to a layer of a multilayer coating that is located anywhere in the multilayer coating except for as the furthest layer from a major surface of a substrate, i.e., an intermediary layer is not a top (i.e., outermost) layer. Rather, an intermediary layer is disposed between a top layer and the substrate. In some embodiments an intermediary layer is located between a top layer and a layer attached to a major surface of the substrate, while in other embodiments an intermediary layer is attached to a major surface of the substrate as a bottom layer.

The term "bottom layer" refers to a layer of a multilayer coating that is attached to a major surface of a substrate.

The term "primer layer" refers to a bottom layer configured to assist in adhering another layer to a substrate. A bottom layer that is acts as a primer preferably comprises acid-sintered silica nanoparticles. The first silica layer is often the bottom layer.

The term "adjacent" in reference to a first layer being adjacent to a substrate, means that the first layer can contact a surface of the substrate or can be separated from a surface of the substrate by one or more intermediary layers. Similarly, the term "adjacent" in reference to a first layer being adjacent to a second layer, means that the first layer can contact the second layer or can be separated from the second layer by one or more intermediary layers.

The term "slide coating" refers to a method of preparing a multilayer coating in which individual fluid layers are metered onto an inclined slide surface provided by the coating apparatus die parts themselves. The incline slide surface creates a cascade flow of the individual fluid layers, which are delivered to a lip of the slide coater. The fluid layers form a bead at the lip and the bead bridges across the die lip to a substrate web.

The term "slide coater" refers to an apparatus for slide coating a multilayer coating on a substrate.

In a first aspect, an article is provided that includes (a) a substrate and (b) a multilayer coating attached to the substrate. The multilayer coating includes (i) a first silica layer that is a primer layer of the multilayer coating directly attached to the substrate, and (ii) a first PVA-containing layer disposed directly adjacent to the first silica layer. The first PVA-containing layer comprises between 10 weight percent and 100 weight percent poly(vinyl alcohol) (PVA). The first silica layer comprises a plurality of acid-sintered interconnected silica nanoparticles arranged to form a continuous three-dimensional porous network.

A multilayer coating on a major surface of an article comprises at least two layers: a first silica layer and a first PVA-containing layer. In some embodiments, a multilayer coating includes three layers, four layers, five layers, or six or more layers. There is at least one PVA-containing layer. Additionally, any other intermediary layer typically comprises PVA, silica nanoparticles, or a combination thereof. In any of these additional layers, the PVA can be crosslinked or not crosslinked. The silica in any of these additional layers contain silica nanoparticles that can, but that are not required to be, acid-sintered interconnected silica nanoparticles arranged to form a continuous three-dimensional porous network. In some embodiments, the top layer (i.e., outermost layer) comprises PVA, the bottom layer adjacent to the substrate comprises acid-sintered silica nanoparticles, and each optional intermediary layer comprises silica nanoparticles, PVA, or preferably a composite of silica nanoparticles and PVA.

The presence of the one or more PVA-containing layers has been discovered to significantly improve the durability of articles having multilayer coatings, for example as measured by circular Taber abrasion testing and/or by falling sand testing. Without wishing to be bound by theory, it is believed that the presence of at least one PVA layer improves the toughness of the coating due to the flexibility of PVA, which allows stress and strain to dissipate and thereby minimizes cracking of the multilayer coating. Optionally, the PVA of one or more PVA-containing layers comprises crosslinked PVA, which provides resistance to both dry and wet abrasion. In particular, the crosslinking of PVA improves the resistance of the PVA to liquids, such as water. In some embodiments the coated article is more readily cleanable. By "cleanable" it is meant the coating composition, when cured, provides oil and soil resistance to help prevent the coated article from being soiled by exposure to contaminants such as oils or adventitious dirt. The multilayer coating can also make the coating easier to clean if it is soiled, so only a simple rinse in water is required to remove contaminants.

In some embodiments, multilayer coatings of the present invention impart anti-fog properties to substrates coated therewith. Coatings are considered anti-fogging if a coated substrate resists the formation of small, condensed water droplets in sufficient density to significantly reduce the transparency of the coated substrate such that it cannot be adequately seen through after exposure to repeated human breath directly on the article and/or after holding the article above a source of steam. A coating may still be regarded as anti-fogging even though a uniform water film or a small number of large water droplets forms on the coated substrate so long as the transparency of the coated substrate is not significantly reduced such that it cannot be readily seen through. In many instances, a film of water that does not significantly reduce the transparency of the substrate will remain after the substrate has been exposed to a steam source. There are numerous instances where the value of optically clear articles would be enhanced if the tendency of the articles to cause light scattering or glare or to be obscured by the formation of a fog on a surface of the article could be reduced. For example, architectural glazings, decorative glass frames, motor vehicle windows and windshields may all scatter light in a manner that causes an annoying and disruptive glare. Use of such articles may also be detrimentally affected by the formation of a moisture vapor fog on a surface of the article. Ideally, in preferred embodiments, the coated articles of this invention have exceptional anti-fog properties while also separately having greater than 90 percent transmission of 550 nm light. The polymeric substrates may comprise polymeric sheet, film, or molded material.

PVA is a polymer that is known and available commercially. Typically, PVA is prepared by hydrolyzing acetate groups to hydroxyl groups. PVA, silane-modified PVA, crosslinked PVA, and combinations thereof, are employed in embodiments of multilayer coatings of the present invention. Silane-modified PVA is believed to provide improved strength to the PVA, to enhance adhesion of the PVA to silica present in other layers of the multilayer coating, and/or to assist in crosslinking of the PVA. Suitable silane-modified polyvinyl alcohols include those known in the art, such as silane-modified PVA produced via treating vinyl alcohol polymers with one or more ethylenically unsaturated, silane-containing monomers at elevated temperature. See, for example, U.S. Pat. No. 7,723,424 (Hashemzadeh et al.). Alternatively, U.S. Pat. No. 4,567,221 (Maruyama et al.) discloses synthesizing a silylated PVA by copolymerizing vinyl acetate and vinyl alkoxy silanes, subsequently followed by hydrolyzing the acetate groups. Any suitable PVA may be employed, for example KURARAY R-2105, which is a trade designation for a silane modified polyvinyl alcohol polymer commercially available from Kuraray Co. LTD, Japan. Another suitable PVA is KURARAY PVA 235, which is a trade designation for a polyvinyl alcohol polymer that is also commercially available from Kuraray Co. LTD, Japan. Suitable PVA polymers often comprise a molecular weight between about 16,000 and 200,000 grams per mole.

Compositions used to form a layer comprising crosslinked PVA contain at least one suitable crosslinking agent. Various suitable methods are available to crosslink PVA, such as using crosslinking agents including but not limited to silanes, multi-functional aldehydes, and acids. For instance, a combination of tetraethoxysilane (TEOS) and silica nanoparticles acts as a crosslinking agent for silane-modified PVA, in which crosslinking occurs between the silanes on the silane-modified PVA and the hydrolyzed TEOS groups or the silanes on the silica. See, e.g., U.S. Pat. No. 4,567,221 (Maruyama et al.) and European Patent No. 0662102B1 (Sharp). Glutaraldehyde, melamine-formaldehyde, and a combination of an aldehyde and a phenolic or naphtholic compound, are examples of suitable multi-functional aldehyde crosslinking agents. Crosslinking using aldehydes involves acetal or aminal formation between the aldehyde and the hydroxyl groups of the PVA. See, e.g., U.S. Pat. No. 4,859,717 (Hoskin et al.). Boron compounds such as boric acid or alkaline borate are also effective crosslinking agents for PVA, likely due to boronate ester formation between PVA and the borate groups. See, e.g., U.S. Pat. No. 3,692,725 (Duchane). In some embodiments, a layer comprising PVA and at least one crosslinking agent is dried and cured at elevated temperature, such as at a temperature of at least 50° C., or 80° C., for at least four minutes, or at least six minutes, or at least eight minutes, or at least ten minutes.

The amount of crosslinker included in a PVA-containing coating composition (e.g., the first PVA-containing coating composition) can be any suitable amount depending, for example, on the particular application and the desired properties. In many embodiments, the PVA-containing coating composition can include up to 50 weight percent, up to 40 weight percent, up to 30 weight percent, up to 20 weight percent, or up to 10 weight percent of the crosslinker based on a total weight of the PVA coating composition. For example, the crosslinker can be in the range of 1 to 75 weight percent, 1 to 70 weight percent, 1 to 60 weight percent, 1 to 50 weight percent, 1 to 40 weight percent, 1 to 30 weight percent, 1 to 20 weight percent, 1 to 10 weight percent, 1 to 5 weight percent, or 1 to 3 weight percent.

Generally, the total weight of PVA in a PVA-containing coating composition is at least 0.1 weight percent based on the total weight of the coating composition. The amount of PVA in a coating composition can be, for example, in the range of 0.1 to 99 weight percent, in the range of 0.1 to 80 weight percent, in the range of 1 to 60 weight percent, in the range of 1 to 40 weight percent, in the range of 1 to 10 weight percent, in the range of 15 to 50 weight percent, in the range of 20 to 40 weight percent, or in the range of 0.5 to 25 weight percent. For example, a coating composition can include at least 1 weight percent, at least 2 weight percent, or at least 5 weight percent PVA. A coating composition often contains up to 10 weight percent, up to 9 weight percent, up to 8 weight percent up to 7 weight percent, up to 6 weight percent, or up to 5 weight percent PVA. In certain embodiments in which silica nanoparticles are included in a coating composition also comprising 0.1 to 2 wt. % PVA, preferably the silica nanoparticles have an average particle size of 10 to 500 nanometers (nm), or 20 to 300 nm. Further, in such embodiments the ratio of silica nanoparticles to PVA is preferably 70:30.

A first silica layer of a multilayer coating includes a porous network of acid-sintered silica nanoparticles. The term "nanoparticle" refers to silica particles that are submicron in size. The nanoparticles have an average particle size, which typically refers to the average longest dimension of the particles, that is no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods can be used as well. The average particle size refers to the average particle size of the primary silica nanoparticles used to form the silica layer coating. The average particle size typically refers to the average size of non-agglomerated and/or non-aggregated and/or non-sintered single nanoparticles of silica. That is, the average particle size refers to the average particle size of the primary silica nanoparticles prior to sintering under acidic conditions.

The first silica layer contains multiple silica nanoparticles that are joined together into a three dimensional network by low temperature (e.g., at or near room temperature) sintering in the presence of an acid (i.e., chemical sintering). The silica nanoparticles in a silica layer are acid-sintered. At least some adjacent nanoparticles in the porous network tend to have bonds such as silica "necks" joining them together. These silica necks are typically formed by acidification of the silica nanoparticles, and are attributed to the catalytic action of strong acid in making and breaking siloxane bonds.

Stated differently, at least some adjacent silica nanoparticles tend to be joined together forming a three dimensional porous network. The term "network" refers to a continuous three-dimensional structure formed by linking together silica nanoparticles. The term "continuous" means that the individual silica nanoparticles are linked over the dimension of the layer coating. A silica layer comprising acid-sintered silica nanoparticles typically has virtually no discontinuities or gaps in the areas where the coating composition is applied to the substrate. The term "agglomerated" refers to multiple bonding between the silica particles which have many points of contact with one or another. As result of the necking, bonding or entanglements of the silica particles, the original particle shapes may be deformed. Transmission electron microscopy generally reveals that at least 25%, preferably at least 50% of the silica particles in the resultant coatings are bonded to adjacent particles.

Figure 1A:
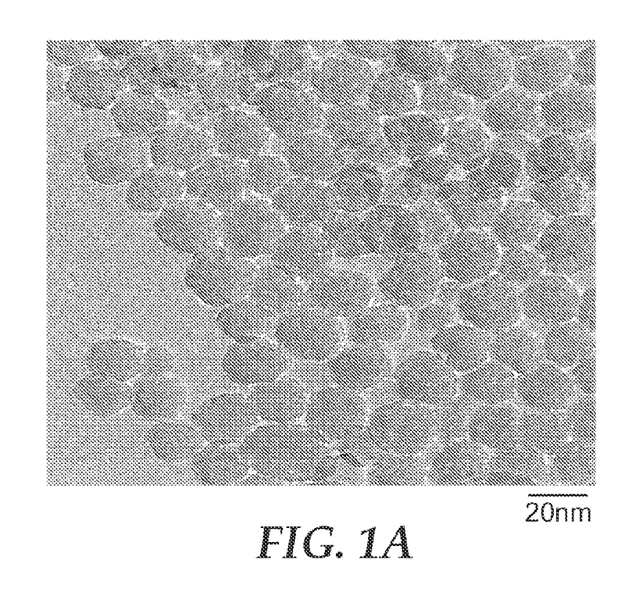
FIG. 1A is a transmission electron micrograph of a comparative example silica layer formed without acid-sintering of the silica nanoparticles.
Figure 1B:
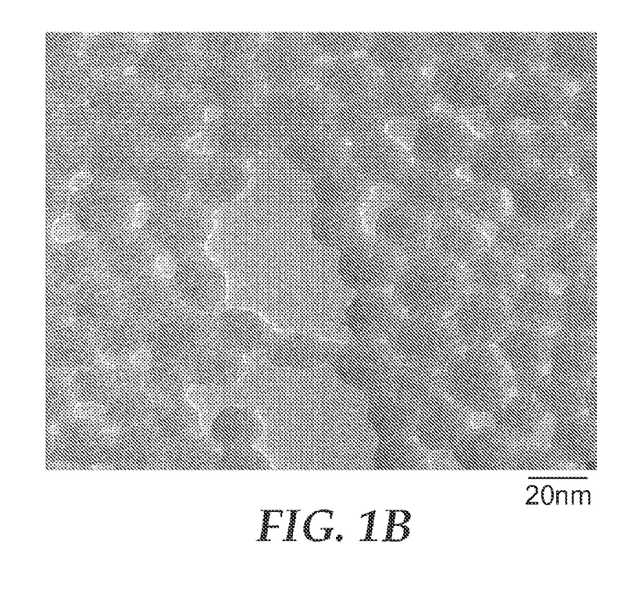
FIG. 1B is a transmission electron micrograph of an exemplary silica layer formed using acid-sintered silica nanoparticles.

FIG. 1A is a transmission electron micrograph of a layer of silica nanoparticles from ethanol at a basic pH. The layer is non-uniform and the individual particles are not linked to the adjacent particles. In contrast to FIG. 1A, FIG. 1B is a transmission electron micrograph of one example silica layer comprising acid-sintered silica nanoparticles. Unlike fumed silica particles that are simply chains of sintered silica nanoparticles, the acid-sintered layer is a continuous network of chemically sintered interconnected nanoparticles, which can be arranged to form a three-dimensional layer. The chains of fumed silica are not connected together and typically form a layer by combination with a binder such as a polymeric binder. The silica layers of the acid-sintered silica nanoparticles generally do not include an organic binder. Rather, any organic materials present in the silica layer are simply located within various pores (e.g., voids) of the interconnected network. Further, fumed silica particles are formed at relatively high temperatures such as at temperatures greater than 300° C., greater than 400° C., or greater than 500° C. In contrast, the acid-sintered layer is formed by sintering the silica nanoparticles at relatively low temperatures such as at or near room temperature in the presence of an acid.

The term "porous" refers to the presence of voids between the individual silica nanoparticles within the continuous silica layer. Preferably, when dried, the network has a porosity of 20 to 50 volume percent, 25 to 45 volume percent, or 30 to 40 volume percent. In some embodiments the porosity may be higher. Porosity may be calculated from the refractive index of the coating according to published procedures such as in W. L. Bragg, A. B. Pippard, *Acta Crystallographica*, volume 6, page 865 (1953). Porosity tends to correlate to the roughness of the surface. The porosity tends to also correlate with the hydrophilicity of the surface. That is, increased surface roughness tends to lead to increased hydrophilicity. Porosity of the surface can often be increased by using silica nanoparticles with a larger average particle size or by using a mixture of silica nanoparticles with different shapes.

Not wishing to be bound by theory, it is believed that the agglomerates of the silica nanoparticles are formed by through acid-catalyzed siloxane bonding in combination with protonated silanol groups at the particle surfaces and these agglomerates explain the coatability on hydrophobic organic surfaces, as these groups tend to be bonded, adsorbed, or otherwise durably attached to hydrophobic surfaces. Although aqueous organic solvent-based coatings of nanoparticle silica dispersions have been described, such mixtures of water and an organic solvents may suffer from differential evaporation rates that result in continuously changing composition of the liquid phase, which consequently changes the coating properties; resulting in poor uniformity and defects. Although surfactants may help the wetting property of dispersions, they may interfere with interparticular and interfacial substrate adhesion.

The primary silica nanoparticles used to prepare acid-sintered silica coating compositions can have any desired shape or mixture of shapes. The silica nanoparticles can be spherical or non-spherical (i.e., acicular) with any desired aspect ratio. Aspect ratio refers to the ratio of the average longest dimension of the nanoparticles to the average shortest dimension of acicular silica nanoparticles. The aspect ratio of acicular silica nanoparticles is often at least 2:1, at least 3:1, at least 5:1, or at least 10:1. Some acicular nanoparticles are in the shape of rods, ellipsoids, needles, and the like. The shape of the nanoparticles can be regular or irregular. The porosity of the coatings can be varied by changing the amount of regular and irregular shaped nanoparticles in the composition and/or by changing the amount of spherical and acicular nanoparticles in the composition.

If the silica nanoparticles are spherical, the average diameter is often up to 500 nanometers, less than 50 nanometers, less than 40 nanometers, less than 25 nanometers, or less than 20 nanometers, or up to 20 nanometers. Some nanoparticles can have an even smaller average diameter such as less than 10 nanometers or less than 5 nanometers.

If the silica nanoparticles are acicular, they often have an average width (smallest dimension) equal to at least 1 nanometer, at least 2 nanometers, or at least 5 nanometers. The average width of acicular silica nanoparticles is often no greater than 25 nanometers, no greater than 20 nanometers, or no greater than 10 nanometers. The acicular silica nanoparticles can have an average length $D_1$ measured by dynamic light scattering methods that is, for example, at least 40 nanometers, at least 50 nanometers, at least 75 nanometers, or at least 100 nanometers. The average length $D_1$ (e.g., longer dimension) can be up to 200 nanometers, up to 400 nanometers, or up to 500 nanometers. The acicular colloidal silica particles may have degree of elongation $D_1/D_2$ in a range of 5 to 30, wherein $D_2$ means a diameter in nanometers calculated by the equation $D_2=2720/S$ and S means specific surface area in meters squared per gram ($m^2$/gram) of the nanoparticle, as described in U.S. Pat. No. 5,221,497 (Watanabe et al.).

In many embodiments, the silica nanoparticles are selected to have an average specific surface area equal to at least 150 $m^2$/gram, at least 200 $m^2$/gram, at least 250 m²/gram, at least 300 m²/gram, or at least 400 m²/gram. Spherical nanoparticles having average specific surface areas equal to at least 150 m²/gram often have an average diameter less than 40 nanometers, less than 30 nanometers, less than 25 nanometers, or less than 20 nanometers.

In certain embodiments, the silica nanoparticles preferably have an average particle size (i.e., longest dimension) that is no greater than 50 nanometers, no greater than 40 nanometers, no greater than 25 nanometers, or up to 20 nanometers. If desired, larger silica nanoparticles may be added in limited amounts that do not deleteriously decrease the coatability of the silica coating composition on a selected substrate or another coating layer, that do not reduce the desired transmissivity of the resulting layer, and/or that do not reduce the desired hydrophilicity of the resulting layer. Thus, various sizes and/or various shapes of particles may be used in combination.

In certain embodiments, bimodal distributions of particle sizes may be used. For example, nanoparticles having an average particle size of at least 50 nanometers (e.g., in the range of 50 to 200 nanometers or in the range of 50 to 100 nanometers) can be used in combination with nanoparticles having an average diameter no greater than 40 nanometers. The weight ratio of the larger to smaller nanoparticles can be in the range of 2:98 to 98:2, in the range of 5:95 to 95:5, in the range of 10:90 to 90:10, or in the range of 20:80 to 80:20. Coating compositions having a bimodal distribution of silica nanoparticles can include 0.1 to 20 weight percent silica nanoparticles having an average particle size of 40 nanometers or less and 0 to 20 weight percent silica nanoparticles having an average particle size of 50 nanometers or greater. The amount is based on a total weight of the silica coating composition. In certain embodiments, coating compositions having a bimodal distribution of silica nanoparticles include particles with average diameters of about 5 nanometers as well as particles with average diameters of about 20 nanometers.

Generally, the total weight of silica nanoparticles (regardless of size) in a silica coating composition is at least 0.1 weight percent based on the total weight of the layer coating composition. For example, a silica coating composition can include at least 1 weight percent, at least 2 weight percent, or at least 5 weight percent silica nanoparticles. A silica coating composition often contains up to 50 weight percent, up to 40 weight percent, up to 25 weight percent up to 20 weight percent, or up to 10 weight percent silica nanoparticles. The amount of silica nanoparticles in the silica layer coating composition can be, for example, in the range of 0.1 to 50 weight percent, in the range of 1 to 40 weight percent, in the range of 1 to 25 weight percent, in the range of 1 to 20 weight percent, in the range of 5 to 20 weight percent, in the range of 1 to 10 weight percent, in the range of 5 to 10 weight percent, or in the range of 1 to 7 weight percent. The silica nanoparticles are typically commercially available in the form of a silica sol. Some example spherical silica nanoparticles are available in the form of aqueous-based silica sols such as those commercially available under the trade designation LUDOX (e.g., LUDOX SM) from E.I. DuPont de Nemours and Co., Inc. (Wilmington, Del.). Other example aqueous-based silica sols are commercially available under the trade designation NYACOL from Nyacol Co. (Ashland, Mass.). Still other example aqueous-based silica sols are commercially available under the trade designation NALCO (e.g., NALCO 1115, NALCO 2326, and NALCO 1130) from Ondea Nalco Chemical Co. (Oak Brook, Ill.). Yet other example aqueous-based silica sols are commercially available under the trade designation REMASOL (e.g., REMASOL SP30) from Remet Corporation (Utica, N.Y.) and under the trade designation SILCO (e.g., SILCO LI-518) from Silco International (Portland, Oreg.). Further suitable spherical silica nanoparticles may be obtained in the form of aqueous-based silica sols under the trade designation SNOWTEX from Nissan Chemical Industries (Tokyo, Japan).

Suitable non-spherical (i.e., acicular) silica nanoparticles may be obtained in the form of aqueous-based silica sols under the trade designation SNOWTEX from Nissan Chemical Industries (Tokyo, Japan). For example, SNOWTEX-UP contains silica nanoparticles having a diameter in the range of about 9 to 15 nanometers with lengths in a range of 40 to 300 nanometers. SNOWTEX-PS-S and SNOWTEX-PS-M have a chain of beads morphology. The SNOWTEX-PS-M particles are about 18 to 25 nanometers in diameter and have lengths of 80 to 150 nanometers. The SNOWTEX-PS-S has a particle diameter of 10-15 nm and a length of 80-120 nanometers.

Either water or a water-miscible organic solvent can be used to dilute commercially available aqueous-based silica sols.

The silica coating composition (e.g., the first silica coating composition) contains an acid having a pKa ($H_2O$) that is less than or equal to 3.5. The use of weaker acids such as those having a pKa greater than 4 (e.g., acetic acid) typically does not result a uniform coating (i.e., layer) having desirable transmissivity and/or durability. In particular, coating compositions with weaker acids such as acetic acid typically bead up on the surface of a substrate. The pKa of the acid added to the coating composition is often less than 3, less than 2.5, less than 2, less than 1.5, or less than 1. Useful acids that can be used to adjust the pH of the silica coating composition include both organic and inorganic acids. Example acids include, but are not limited to, oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. In many embodiments, the acid is HCl, $HNO_3$, $H_2SO_4$, or $H_3PO_4$. Without wishing to be bound by theory, it is believed that some of the silica in contact with acid undergoes a condensation reaction in which silicon dioxide is reacted with acid to form a silicic acid. The silicic acid is capable of forming a continuous three-dimensional porous network of interconnected acid-sintered silica nanoparticles upon drying of the acidified silica coating composition. In some embodiments, it is desirable to provide a mixture of an organic and inorganic acid. If commercially available acidic silica sols are used, the addition of one of the acids listed above typically result in silica layers having the desired uniformity.

The silica coating composition (e.g., the first silica coating composition) generally contains sufficient acid to provide a pH no greater than 5. The pH is often no greater than 4.5, no greater than 4, no greater than 3.5, or no greater than 3. For example, the pH is often in the range of 2 to 5. In some embodiments, the silica coating composition can be adjusted to a pH in the range of 5 to 6 after first reducing the pH to less than 5. This pH adjustment can allow the coating of pH sensitive substrates. The acid-sintered silica nanoparticles appear to be stable when the pH is in the range 2 to 4. Light-scattering measurements have demonstrated that the acidified silica nanoparticles at pH in the range of 2 to 3 and at a concentration of 10 weight percent silica nanoparticles can retain the same size for more than a week or even more than a month. Such acidified silica coating compositions are expected to remain stable even longer if the concentration of silica nanoparticles is lower than 10 weight percent.

Silica coating compositions (e.g., the first silica coating composition) typically further include water or a mixture of water plus a water-miscible organic solvent. Suitable water-miscible organic solvents include, but are not limited to, various alcohols (e.g., ethanol or isopropanol) and glycols (e.g., propylene glycol), ethers (e.g., propylene glycol methyl ether), ketones (e.g., acetone), and esters (e.g., propylene glycol monomethyl ether acetate). The silica nanoparticles included in the silica coating compositions typically are not surface modified.

In some embodiments, optional silane coupling agents, which contain a plurality of reactive silyl groups, can be added to the silica coating compositions (e.g., the first silica coating composition). Some example coupling agents include, but are not limited to, tetraalkoxysilanes (e.g., tetraethylorthosilicate (TEOS)) and oligomeric forms of tetraalkoxysilane such as alkyl polysilicates (e.g., poly(diethoxysiloxane). These coupling agents may, at least in some embodiments, improve binding between silica nanoparticles. If added, the coupling agent is typically added to the silica coating composition at levels of 0.1 to 30 weight percent based on the weight of the silica nanoparticles in the coating composition. In some examples, the coupling agent is present in an amount in the range of 0.1 to 25 weight percent based on the weight of the silica nanoparticles, in the range of 1 to 25 weight percent, in the range of 5 to 25 weight percent, in the range of 10 to 25 weight percent, in the range of 0.1 to 20 weight percent, in the range of 1 to 20 weight percent, in the range of 1 to 15 weight percent, in the range of 1 to 10 weight percent, or in the range of 1 to 5 weight percent based on the weight of silica nanoparticles. In other examples, however, the silica coating compositions do not include a coupling agent. Many silica coating compositions do not contain other types of binders other than coupling agents. That is, many silica coating compositions do not contain typical polymeric binders, or at most up to 25 weight percent polymeric resins, which fill up void volume between interconnected silica particles rather than binding the silica nanoparticles together.

As applied to a substrate surface as a primer layer and optionally as an intermediary layer, the silica coating composition (e.g., the first silica coating composition) is a sol. After the silica coating composition is applied to the substrate or other layer, a gelled material forms as the sol dries and the silica nanoparticles sinter to form the continuous network.

The first silica layer can be located adjacent to any substrates, which are discussed in greater detail below. The term "adjacent" in reference to the first silica layer means that the first silica layer can contact a surface of the substrate or can be separated from a surface of the substrate by one or more intermediary layers. More particularly, the first silica coating composition is applied to contact the substrate, typically functioning as a primer layer. The substrate can be an organic material (e.g., polymeric) or inorganic material (e.g., glass, ceramic, or metal). In many embodiments, the substrate is hydrophobic. The wetting property of such first silica coating compositions on hydrophobic surfaces (e.g., hydrophobic polymeric substrates such as polyethylene terephthalate (PET) or polycarbonate (PC)) is a function of the pH of the first silica coating compositions and the pKa of the acid used to adjust the pH. The coating compositions can be applied, for example, to hydrophobic substrates when acidified to a pH in the range of 2 to 5. In contrast, similar silica coating compositions with a neutral or basic pH tend to bead up on the hydrophobic substrates.

The first silica coating compositions are typically applied to the substrate using conventional techniques such as, for example, bar coating, roll coating, curtain coating, rotogravure coating, knife coating, spray coating, spin coating, dip coating, or slide coating techniques. Coating techniques such as bar coating, roll coating, and knife coating are often used to adjust the thickness of the bottom layer coating. The first silica coating compositions can be coated on one or more sides of the substrate.

Once applied to the substrate, the coated first silica coating composition is typically dried at temperatures in a range from 20° C. to 150° C. An oven with circulating air or inert gas such as nitrogen is often used for drying purposes. The temperature may be increased further to speed the drying process, but care should be exercised to avoid damage to the substrate. For inorganic substrates, the drying temperature can be above 200° C.

The optimal average dry coating thickness of a first silica layer is dependent upon the particular first silica coating composition used. In general, average thickness of the (dry) first silica layer is in the range of 100 to 10,000 angstroms (Å), in the range of 500 to 2500 Å, in the range of 750 to 2000 Å, or in the range of 1000 to 1500 Å. The thickness can be measured using an ellipsometer such as a Gaertner Scientific Corp. Model No. L115C. Although the actual coating thickness can vary considerably from one particular point to another, it is often desirable to apply the first silica coating composition uniformly over the surface of the substrate. For example, to minimize visible interference color variations in the coating, it may be desirable to control the average coating thickness within 200 Å, within 150 Å, or within 100 Å across the substrate.

Alternatively, the typical average (dry) coating thickness of a silica layer coating is in the range of 1000 to 100,000 Å, in the range of 1000 to 50,000 Å, in the range of 1000 to 20,000 Å, in the range of 5000 to 15,000 Å, in the range of 5000 to 10,000 Å, or in the range of 1000 to 10,000 Å. Each silica layer typically contains at least 75 weight percent, at least 80 weight percent, at least 85 weight percent silica nanoparticles, based on a total weight of the dried silica layer. The (dried) silica layer can contain up to 90 weight percent, up to 95 weight percent, or up to 99 percent or higher silica nanoparticles based on the total weight of the dried silica layer. For example, the dried silica layer can contain 75 to greater than 99 weight percent, 75 to 95 weight percent, 75 to 90 weight percent, 75 to 99 weight percent, 85 to 99 percent, 85 to 95 weight percent, 80 to 99 weight percent, or 85 to 95 weight percent silica nanoparticles.

The bottom (e.g., primer) layer can contain some water such as the amount of water typically associated with equilibrium of the layer with the atmospheric moisture present in the environment of the bottom layer. This equilibrium amount of water is typically no greater than 5 weight percent, not greater than 3 weight percent, no greater than 2 weight percent, no greater than 1 weight percent, or not greater than 0.5 weight percent based on a total weight of the (dried) bottom layer.

The layer attached to the article substrate in the multilayer coating construction is the first silica layer that is a layer of acid-sintered silica nanoparticles. In certain embodiments, a small amount of PVA is included in this first silica layer, for example less than 20% by weight, or less than 15% by weight, or less than 10% by weight, or less than 5% by weight, of the total first silica layer. Such a layer primarily improves adhesion of the multilayer coating to the substrate. Typical first silica coating compositions containing the acidified silica nanoparticles usually are applied to a substrate surface and then dried. In many embodiments, the first silica coating composition contains (a) silica nanoparticles having an average particle diameter (i.e., average particle diameter prior to acid-sintering) of up to 20 nanometers and (b) an acid with a pKa ($H_2O$) that is less than or equal to 3.5. The pH of the first silica coating composition is pH is less than or equal to 5 such as in the pH range of 2 to 5.

The overall coating construction may be applied by sequential coating of each coating composition (e.g., multi-pass), or in one coating step such as via slide coating (e.g., single pass). Preferably, the silica coating compositions include acid-sintered silica nanoparticles. PVA coating compositions include PVA, which is optionally silane-modified PVA.

In some embodiments, coating compositions including composites of both PVA and silica nanoparticles contain more PVA (by weight) than silica nanoparticles, in some embodiments composites contain more silica nanoparticles (by weight) than PVA, and in alternate embodiments the composites contain approximately equal amounts by weight of PVA and silica nanoparticles. For convenience, a layer is referred to herein as a "silica layer" if it contains 75% or greater by weight (of the dried layer) of silica nanoparticles. When the silica nanoparticles are acid-sintered silica nanoparticles, the silica layer typically forms a continuous three-dimensional porous network of interconnected silica nanoparticles when the silica layer contains 75% or greater by weight of the dried silica layer. Without wishing to be bound by theory, it is believed that additional components included in such silica layers are located within the pores of the continuous network of acid-sintered silica nanoparticles.

For convenience a layer is referred to herein as a "PVA-containing layer" if it contains between 10% by weight and 100% by weight (of the dried layer) of PVA.

Any suitable silica nanoparticles may be included in a PVA-containing layer or a silica layer, for example and without limitation commercially available silica nanoparticles, acid-sintered silica nanoparticles, etc. The silica nanoparticles are optionally acid-sintered or not acid-sintered silica nanoparticles, but preferably acid-sintered silica nanoparticles.

Further, for convenience, a layer is referred to as an "intermediary layer" regardless of how much PVA, silica nanoparticles, or combinations thereof that the layer contains with the proviso that it is positioned anywhere other than as the outermost layer of the multilayer coating (i.e. attached to a major surface of a substrate or located anywhere between a substrate and an outermost layer), as previously defined.

In certain circumstances, the inclusion of silica nanoparticles in a layer comprising PVA improves the adhesion of the layer to at least one adjacent layer that contains silica particles. Similarly, in certain circumstances, the inclusion of a small amount of PVA in a layer comprising a larger amount of silica nanoparticles improves the adhesion of the layer to at least one adjacent layer that contains PVA.

Figure 2:
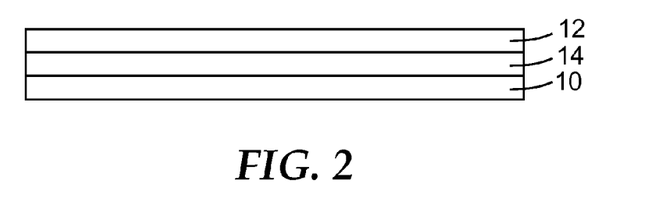
FIG. 2 is an exemplary schematic of a two-layer multilayer coating on a substrate.
Figure 3:
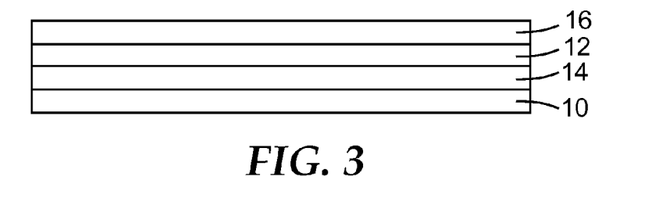
FIG. 3 is an exemplary schematic of a three-layer multilayer coating on a substrate.
Figure 4:
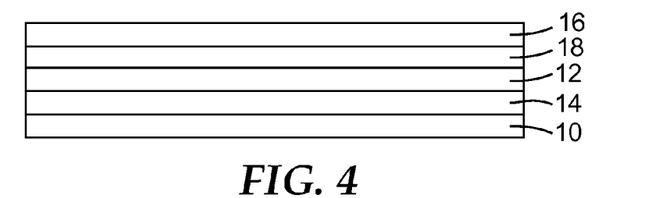
FIG. 4 is an exemplary schematic of a four-layer multilayer coating on a substrate.

FIG. 2 is an exemplary schematic of a two-layer multi-layer coating on a substrate 10. In particular, FIG. 2 illustrates a PVA-containing layer 12 and a first silica layer 14 disposed between the substrate 10 and the PVA-containing layer 12. The first silica layer 14 is a primer layer attached to the substrate 10. FIG. 3 is an exemplary schematic of a three-layer multilayer coating on a substrate 10. FIG. 3 illustrates a PVA-containing layer 12 and a first silica layer 14 disposed between the substrate 10 and the PVA-containing layer 12, as well as a first intermediary layer 16 disposed adjacent to the PVA-containing layer 12. FIG. 4 is an exemplary schematic of a four-layer multilayer coating on a substrate 10. FIG. 4 illustrates a PVA-containing layer 12 and a first silica layer 14 disposed between the substrate 10 and the PVA-containing layer 12, as well as a first intermediary layer 16 disposed adjacent to the PVA-containing layer 12, and a second intermediary layer 18 disposed between the PVA-containing layer 12 and the second intermediary layer 16. The second and third intermediary layers, if present, optionally independently comprise PVA, silica nanoparticles, crosslinked PVA, and combinations thereof. Most preferably, each additional intermediary layer comprises both PVA and silica nanoparticles. At least one of the second and third intermediary layers preferably comprises a silica layer. Other layers may also be included in the multilayer coatings according to embodiments of the present invention, including layers generally known in the art of multilayer coatings, such as tie layers, oxygen barrier layers, print layers, and the like.

The typical average (dry) coating thickness of a top or intermediary layer coating is in the range of 1000 to 300,000 Å, in the range of 10,000 to 200,000 Å, in the range of 10,000 to 100,000 Å, in the range of 20,000 to 80,000 Å, in the range of 5000 to 50,000 Å, or in the range of 1000 to 10,000 Å.

An outermost or intermediary PVA-containing layer typically contains at least 40 weight percent, at least 25 weight percent, at least 15 weight percent, at least 10 weight percent, at least 5 weight percent, or at least 3 weight percent PVA based on a total weight of the (dried) layer. For example, an outermost or intermediary layer containing PVA can contain 10 to 100 weight percent, 3 to 99 weight percent, 3 to 80 weight percent, 5 to 60 weight percent, 5 to 40 weight percent, 10 to 75 weight percent, 10 to 55 weight percent, 15 to 55 weight percent, 3 to 15 weight percent, 3 to 10 percent, 3 to 7 weight percent, 10 to 30 weight percent, or 15 to 25 weight percent PVA.

In embodiments of the article, preferred substrates are made of polyester (e.g., polyethylene terephthalate, polybutyleneterephthalate), polycarbonate, allyldiglycolcarbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters such as acetate and butyrate, glass, ceramic, organic and inorganic composite surfaces and the like, including blends and laminates thereof.

Typically the substrate is in the form of a film, sheet, panel or pane of material and may be a part of an article such as traffic signs, solar panels, architectural glazings, decorative glass frames, and motor vehicle windows and windshields. The coatings may, optionally if desired, cover only a portion of the article. The substrate may be flat, curved or shaped. Preferably, the substrate is selected from the group consisting of a polymeric film, a polymeric sheet, a molded polymeric part, a metal, paper, a UV mirror, a UV stable substrate, a glass substrate, a mirror, a display, a window, or a release liner. The article to be coated may be produced by blowing, casting, pultrusion, extrusion, or injection molding, also by photopolymerization, compression molding or reactive injection molding.

Suitable polymeric materials for substrates include, but are not limited to, polyesters (e.g., polyethylene terephthalate or polybutylene terephthalate), polycarbonates, acrylonitrile butadiene styrene (ABS) copolymers, poly(meth) acrylates (e.g., polymethylmethacrylate or copolymers of various (meth)acrylates), polystyrenes, polysulfones, polyether sulfones, epoxy polymers (e.g., homopolymers or epoxy addition polymers with polydiamines or polydithiols), polyolefins (e.g., polyethylene and copolymers thereof or polypropylene and copolymers thereof), polyvinyl chlorides, polyurethanes, fluorinated polymers, cellulosic materials, derivatives thereof, and the like.

Suitable metals include, for example, pure metals, metal alloys, metal oxides, and other metal compounds. Examples of metals include, but are not limited to, chromium, iron, aluminum, silver, gold, copper, nickel, zinc, cobalt, tin, steel (e.g., stainless steel or carbon steel), brass, oxides thereof, alloys thereof, and mixtures thereof.

In some embodiments, where increased transmissivity is desired, the substrate is transparent. The term "transparent means" transmitting at least 85% of incident light in the visible spectrum (about 400-700 nm wavelength). Transparent substrates may be colored or colorless. In other embodiments, where increased hydrophilicity is desired, the substrate may be initially hydrophobic. The compositions may be applied to a wide variety of substrates by a variety of coating methods. As used herein, "hydrophilic" is used only to refer to the surface characteristics of the thermoplastic polymer layer, i.e., that it is wet by aqueous solutions, and does not express whether or not the layer absorbs aqueous solutions. Accordingly, a thermoplastic polymer layer may be referred to as hydrophilic whether or not the layer is impermeable or permeable to aqueous solutions. Surfaces on which drops of water or aqueous solutions exhibit a static water contact angle of less than 50° are referred to as "hydrophilic." Hydrophobic substrates have a water contact angle of 50° or greater. Coatings described herein may increase the hydrophilicity of a substrate at least 10 degrees, preferably at least 20 degrees.

In some embodiments, the substrate is hydrophobic. The terms "hydrophobic" and "hydrophobicity" refer to a surface on which drops of water or aqueous solutions exhibit a static water contact angle of at least 50 degrees, at least 60 degrees, at least 70 degrees, at least 90 degrees, or at least 100 degrees. In order to uniformly coat, or to enhance the interfacial adhesion, of a composition onto a hydrophobic substrate from an aqueous system it may be desirable to increase the surface energy of the substrate and/or reduce the surface tension of the coating composition. The substrate can be treated using, e.g., chemical treatment, mechanical roughening, corona treatment such as air or nitrogen corona, plasma, flame, or actinic radiation. If desired, an optional tie coating composition can also be applied between the substrate and the additional coating compositions (e.g., silica or PVA-containing coating compositions) to increase the interlayer adhesion. Alternatively, the surface tension of the bottom coating composition may be decreased by addition of lower alcohols (e.g., alcohols having 1 to 8 carbon atoms, 1 to 6 carbon atoms, or 1 to 4 carbon atoms). The other side of the substrate may also be treated using the above-described treatments to improve adhesion between the substrate and an adhesive. In some embodiments, however, in order to improve the coating hydrophilicity for desired antifogging properties and to ensure uniform coating of the article from an aqueous or hydroalcoholic solution, it may be beneficial to add a wetting agent, which is typically a surfactant.

Surfactants are molecules having both hydrophilic (polar) and hydrophobic (non-polar) regions and that are capable of reducing the surface tension of the bottom coating composition. Useful surfactants may include those disclosed, for example, in U.S. Pat. No. 6,040,053 (Scholz et al.). If added, the surfactant is typically present in an amount up to 5 weight percent based on a total weight of the bottom coating composition. For example, the amount can be up to 4 weight percent, up to 2 weight percent, or up to 1 weight percent. The surfactant is typically present in an amount equal to at least 0.001 weight percent, at least 0.005 weight percent, at least 0.01 weight percent, at least 0.05 weight percent, at least 0.1 weight percent or at least 0.5 weight percent of a total coating composition.

Some surfactants for use in the bottom coating compositions (e.g., silica coating compositions) are anionic surfactants. Useful anionic surfactants often have a molecular structure with (1) at least one hydrophobic group such as a $C_6$-$C_{20}$ alkyl, alkylaryl, and/or alkenyl groups, (2) at least one anionic group such as sulfate, sulfonate, phosphate, polyoxyethylene sulfate, polyoxyethylene sulfonate, polyoxyethylene phosphate, and the like, and/or the salts of such anionic groups. Suitable salts include alkali metal salts, ammonium salts, tertiary amino salts, and the like. Representative commercial examples of useful anionic surfactants include, but are not limited to, sodium lauryl sulfate (available, for example, under the trade designation TEXAPON L-100 from Henkel Inc. (Wilmington, Del.) and under the trade designation POLYSTEP B-3 from Stepan Chemical Co. (Northfield, Ill.)); sodium lauryl ether sulfate (available, for example, under the trade designation POLYSTEP B-12 from Stepan Chemical Co. (Northfield, Ill.)); ammonium lauryl sulfate (available, for example, under the trade designation STANDAPOL A from Henkel Inc. (Wilmington, Del.)); and sodium dodecyl benzene sulfonate (available, for example, under the trade designation SIPONATE DS-10 from Rhone-Poulenc, Inc. (Cranberry, N.J.)).

Other useful surfactants for use in the bottom coating compositions (e.g., silica coating compositions) are non-ionic surfactants. Suitable non-ionic surfactants include, but are not limited to, polyethoxylated alkyl alcohols (available, for example, under the trade designations BRIJ 30 and BRIJ 35 from ICI Americas, Inc. (Wilmington, Del.) and under the trade designation TERGITOL TMN-6 from Dow Chemical (Midland, Mich.)); polyethoxylated alkyl phenols (available, for example, under the trade designations TRITON X-100 from Roche (Mannheim, Germany) and ICONOL NP-70 from BASF Corp. (Florham Park, N.J.)); and polyethylene glycol/polypropylene glycol block copolymers (available, for example, under the trade designations TETRONIC 1502, TETRONIC 908, and PLURONIC F38 from BASF Corp. (Florham Park, N.J.)).

In some embodiments, an article is provided comprising a substrate and a multilayer coating attached to the substrate. The multilayer coating comprises a first silica layer disposed between a surface of the substrate and a first PVA-containing layer. The first silica layer is a primer layer of the multilayer coating directly attached to the substrate and comprises a plurality of acid-sintered interconnected silica nanoparticles arranged to form a continuous three-dimensional porous network. The first PVA-containing layer comprises between 10 weight percent and 100 weight percent PVA. The first PVA-containing layer preferably also comprises between 0.5 weight percent and 90 weight percent silica nanoparticles. Optionally, the article further comprises one or more second PVA-containing layers disposed adjacent to the first PVA-containing layer, wherein each of the one or more second intermediary layers comprises PVA, silica nanoparticles, or, preferably, a combination thereof. In some embodiments, the article includes a third or fourth intermediary layer disposed adjacent to the first PVA-containing layer. Each of the second intermediary layer, third intermediary layer, and fourth intermediary layer includes PVA, a plurality of silica nanoparticles, or both.

When one or more intermediary layers comprise PVA, it is optionally crosslinked PVA. In certain embodiments, the PVA comprises a silane-modified PVA. In certain embodiments, each of the bottom (e.g., primer) layer and second intermediary layer comprises acid-sintered silica nanoparticles and each of the first intermediary layer and first PVA-containing layer comprises PVA. Such an article thus contains four alternating silica/PVA-containing/silica/PVA-containing (e.g., inorganic/organic/inorganic/organic) coating layers wherein one PVA layer is an intermediary layer and the other is an outermost PVA-containing layer. As discussed above, each inorganic coating layer may also contain an amount of organic material, and each organic coating layer may also contain an amount of inorganic material.

For instance, in an article including a substrate and a plurality of coating layers, the layers can have one of the following nonlimiting exemplary structures:

1. Substrate/first silica layer/first PVA-containing layer
2. Substrate/first silica layer/first PVA-containing layer/first intermediary layer
3. Substrate/first silica layer/first PVA-containing layer/first intermediary layer/second intermediary layer
4. Substrate/first silica layer/first PVA-containing layer/first intermediary layer/second silica layer
5. Substrate/first silica layer/first PVA-containing layer/first intermediary layer/second intermediary layer/third intermediary layer
6. Substrate/first silica layer/first PVA-containing layer/first intermediary layer/second intermediary layer/third intermediary layer/fourth intermediary layer
7. Substrate/first silica layer/first PVA-containing layer/second PVA-containing layer
8. Substrate/first silica layer/first PVA-containing layer/second PVA-containing layer/second silica layer
9. Substrate/first silica layer/first PVA-containing layer/second PVA-containing layer/third PVA-containing layer
10. Substrate/first silica layer/first PVA-containing layer/second silica layer
11. Substrate/first silica layer/first PVA-containing layer/second PVA-containing layer/third PVA-containing layer/second silica layer In certain embodiments an article is provided including a substrate and a multilayer coating attached to the substrate. The multilayer coating comprises a first silica layer directly attached to a surface of the substrate, a first PVA-containing layer attached to the first silica layer and containing PVA and a plurality of silica nanoparticles, a second PVA-containing layer attached to the first PVA-containing layer and containing PVA and a plurality of silica nanoparticles, and a second silica layer attached to the second PVA-containing layer. The first silica layer comprises a plurality of acid-sintered interconnected silica nanoparticles arranged to form a continuous three-dimensional porous network, and preferably the second silica layer does as well. Optionally, the first silica layer and second silica layer each further contain PVA.

Minor amounts of other optional components can be added to the coating compositions that may impart desirable properties, that may be desirable for particular curing methods or conditions, or that may be desirable for particular surface treatment applications. Examples of other optional components include, but are not limited to, catalysts, initiators, surfactants, stabilizers, anti-oxidants, flame retardants, ultraviolet (UV) absorbers, radical quenchers, and the like, and mixtures thereof.

In a second aspect, a method of making an article is provided. The method includes (a) providing a substrate and (b) attaching a multilayer coating to the substrate. The attaching includes (i) forming a first silica layer that is a primer layer of the multilayer coating directly attached to the substrate, and (ii) forming a first PVA-containing layer directly adjacent to the first silica layer. The first PVA-containing layer comprises between 10 weight percent and 100 weight percent PVA. Optionally, the first PVA-containing layer comprises a silane-modified PVA. In some embodiments, the method further includes forming one or more additional layers in the multilayer coating, including at least one intermediary layer. Such intermediary layers are disposed adjacent to the first PVA-containing layer. In some embodiments, at least one intermediary layer comprises PVA, and the method optionally further comprises crosslinking the PVA of the one or more intermediary layers. Crosslinking of PVA is not particularly limited; for example, crosslinking is performed using an effective crosslinking agent such as a silane (e.g., tetraethoxysilane), a multifunctional aldehyde (e.g., melamine formaldehyde), or an acid (e.g., boric acid), as discussed in detail above.

Preferably, the method comprises layers in accordance with embodiments of the article described above. For example, the first intermediary layer formed by the method may contain a plurality of silica nanoparticles, and the second intermediary layer (if present) formed by the method may also contain a plurality of silica nanoparticles. Similarly, at least one of the intermediary silica layer(s) formed by the method may contain PVA. In an embodiment, a first intermediary layer or a second intermediary layer (if present) comprises a silica layer that is an outermost layer of the multilayer coating. Optionally, such a first intermediary silica layer is attached directly to the first PVA-containing layer.

Forming the first silica layer typically comprises preparing a dispersion containing the silica nanoparticles acidified with an acid having a pKa less than 3.5 to a pH in a range of 2 to 5, coating the dispersion on the substrate, and drying the coating to form the plurality of acid-sintered silica nanoparticles. The dispersion containing the silica nanoparticles optionally comprises silica nanoparticles having a bi-modal size distribution, and/or the dispersion containing the silica nanoparticles comprises silica nanoparticles having average particle diameters up to 20 nanometers.

The multilayer coating compositions can be applied using any suitable application method. The application method often involves forming a coating layer by dip coating, spin coating, spray coating, wiping, roll coating, brushing, spreading, flow coating, vapor deposition, slot coating, slide coating, or the like, or combinations thereof.

Typically, each coating composition can be applied to the substrate such that after curing, a multilayer coated article is formed. That is, in addition to the first silica (e.g., primer) layer, at least one intermediary layer can be positioned between the substrate and the PVA-containing layer. The wet thickness of each layer, for example, can independently be in the range of 0.1 to 100 micrometers, in the range of 0.1 to 50 micrometers, or in the range of 0.1 to 10 micrometers.

After application to the substrate, the coating compositions can be cured by exposure to heat and/or moisture. If a crosslinker is included in the multilayer coating composition, these materials can react with the PVA or silane-modified PVA to crosslink the PVA. Moisture cure can be effected at temperatures ranging from room temperature (for example, 20° C. to 25° C.) up to about 80° C. or more. Moisture curing times can range from a few minutes (for example, at the higher temperatures such as 80° C. or higher) to hours (for example, at the lower temperatures such as room temperature).

Traditional slide coating, as described in U.S. Pat. No. 2,761,419 (Mercier et al), discloses an apparatus for simultaneously coating a plurality of solutions in separate layers onto a substrate. U.S. Pat. No. 6,007,874 (Bhave et al.) discloses methods of multilayer slide coating in which coating defects are minimized. For example, methods of coating fluids made up of incompatible solutes in miscible solvents that minimize the occurrence of strikethrough by selecting the properties of the layer carriers. An advantage of employing slide coating is that it circumvents the need to cure or dry each layer after it has formed on a substrate or on another layer.

Figure 5:
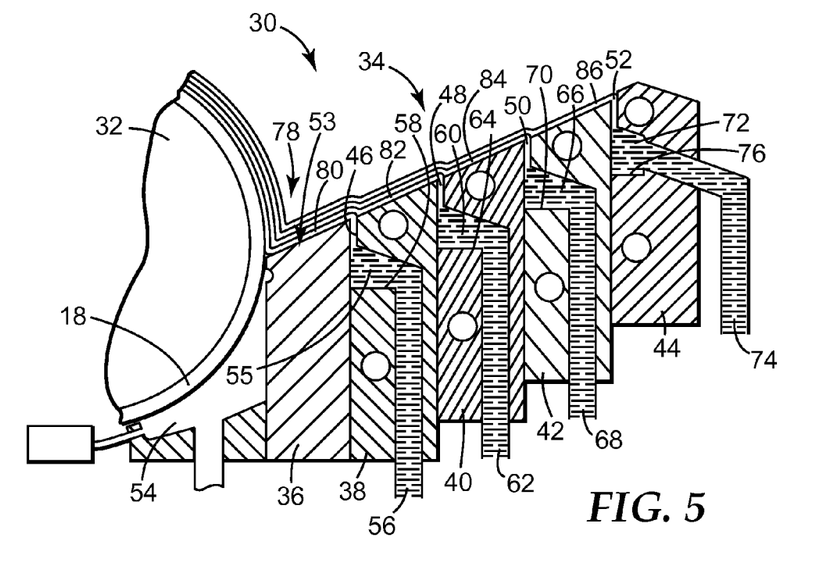
FIG. 5 is a side sectional view of a slide coater.

FIG. 5 illustrates a slide coating apparatus 30 generally made up of a coating back-up roller 32 for the substrate 18, and a slide coater 34. The slide coater 34 includes five slide blocks 36, 38, 40, 42, 44 which define four fluid slots 46, 48, 50, 52 and a slide surface 53. The first slide block is adjacent to the coating back-up roller 32 and includes a vacuum box 54 for adjusting the vacuum level by the slide coating apparatus 30. The vacuum box serves to maintain a differential pressure across the coating bead, thereby stabilizing it.

A first fluid 55 can be distributed to the first slot 46 via a first fluid supply 56 and a first manifold 58. A second fluid 60 can be distributed to the second slot 48 via a second fluid supply 62 and a second manifold 64. A third fluid 66 can be distributed to the third fluid slot 50 via a third fluid supply 68 and a third fluid manifold 70. A fourth fluid 72 can be distributed to the fourth fluid slot 52 via a fourth fluid supply 74 and a fourth fluid manifold 76. This embodiment allows for the creation of up to a four-layer fluid construction 78 including a first fluid layer 80 (a.k.a., a carrier layer), a second fluid layer 82, a third fluid layer 84, and a fourth fluid layer 86. Additional slide blocks can be added for the introduction of additional fluid layers, as required for product performance or ease of operability.

The fluid manifolds 58, 64, 70 and 76 are designed to allow uniform width-wise distribution out of fluid slots 46, 48, 50, 52, respectively. This design is specific to the choice of the slot height for the slots 46, 48, 50, 52. The slot height is made sufficiently small such that the pressure drop in the slot is much higher than the pressure drop across the manifold (without causing undue problems of non-uniformity due to machining limitations or bar deflection due to excessive pressure in the die slot). This ensures that the fluid distributes uniformly in the slot. It is known that slot heights are made smaller when lower flow rates are desired.

Accordingly, in some embodiments the method includes slide coating. More particularly, such methods include forming of the first silica layer and forming of the PVA-containing layer, including flowing a first fluid down a first slide surface of a slide coater, the first fluid comprising a plurality of acidified silica nanoparticles and corresponding to the first silica layer, flowing a second fluid down a second slide surface of the slide coater to form a second fluid layer over the first slide surface, the second fluid comprising PVA and corresponding to the first PVA-containing layer, and coating a substrate with the first and second fluids to form a multilayer fluid coating. In such embodiments the first fluid comprises a plurality of acid-sintered silica nanoparticles and corresponds to the bottom layer. The second fluid comprises PVA and corresponds to the first PVA-containing layer, plus the second fluid is the uppermost fluid of the multilayer fluid coating coated onto the substrate by the slide coater when there are only two layers.

Another advantage of employing a slide coating method includes the capability of crosslinking one or more polymers within a slide coated multilayer coating all at one time and simultaneously with drying and/or curing of the coating layers. This prevents over-crosslinking, which can occur after exposure of a polymer to repeated drying and/or curing cycles. The term "over-crosslinking" refers to an extent of crosslinking that goes beyond a predetermined extent of crosslinking. For example, a polymer that has been crosslinked to the extent that that it has fewer than 10% of functional groups available with which material of another layer could interact for adhesion to the crosslinked polymer, could be considered over-crosslinked.

The method may further include one or more additional layers of coating compositions within the slide coating, such as by flowing a third fluid down a third slide surface of the slide coater. The third fluid is located adjacent to the second fluid, and comprises PVA, a plurality of silica nanoparticles, or both. Optionally, the method further includes flowing a fourth fluid down a fourth slide surface of the slide coater to form a fourth fluid layer over the first slide surface. The fourth fluid comprises a plurality of acid-sintered silica nanoparticles and is located adjacent to the third fluid, and optionally between the second and third fluids. In certain embodiments, the PVA contains a silane-modified PVA. As will be apparent to the skilled practitioner, slide coating methods are suitable for coating any number of layers of a multilayer article onto a substrate, such as at least two layers, at least three layers, at least four layer, at least five layers, or at least six layers. Such layers include intermediary layers selected independently from fluids comprising PVA, silica nanoparticles, and combinations thereof.

In order to achieve optimal fluid flow from the surface of the slide coater onto the substrate, the first fluid will have the highest density of all of the fluids present, the second fluid will have a lower density than the first fluid, the third fluid (if present) will have a lower density than the second fluid, the fourth fluid (if present) will have a lower density than the third fluid, and so on. In summary, each fluid will have a lower density than the fluid disposed directly below it on the slide coater, and conversely, each fluid will have a higher density than the fluid disposed directly above it on the slide coater, regardless of how many individual fluids are present. Various items are described that are articles or methods of making articles.

Item 1 is an article including (a) a substrate and (b) a multilayer coating attached to the substrate. The multilayer coating includes (i) a first silica layer that is a primer layer of the multilayer coating directly attached to the substrate; and (ii) a first PVA-containing layer disposed directly adjacent to the first silica layer, the first PVA-containing layer comprising between 10 weight percent and 100 weight percent poly(vinyl alcohol) (PVA). The first silica layer comprises a plurality of acid-sintered interconnected silica nanoparticles arranged to form a continuous three-dimensional porous network.

Item 2 is an article of item 1, wherein the first PVA-containing layer includes between 0.5 weight percent and 90 weight percent silica nanoparticles.

Item 3 is an article of item 1 or item 2, further including one or more second PVA-containing layers disposed adjacent to the first PVA-containing layer, the second PVA-containing comprising between 10 weight percent and 100 weight percent PVA.

Item 4 is an article of item 3, wherein at least one of the first PVA-containing layer and the second PVA-containing layer comprises crosslinked PVA.

Item 5 is an article of any one of items 3 to 4, wherein the second PVA-containing layer further comprises a plurality of silica nanoparticles.

Item 6 is an article of any one of items 1 to 5, wherein the first silica layer further includes PVA.

Item 7 is an article of any one of items 1 to 6, wherein the silica nanoparticles have a bi-modal size distribution.

Item 8 is an article of any one of items 1 to 7, wherein the silica nanoparticles have average particle diameters up to 20 nanometers.

Item 9 is an article of any one of items 1 to 8, wherein the plurality of acid-sintered interconnected silica nanoparticles are formed from a dispersion including the silica nanoparticles acidified with an acid having a pKa less than 3.5 to a pH in a range of 2 to 5.

Item 10 is an article of any one of items 1 to 9, wherein the first PVA-containing layer includes a silane-modified PVA.

Item 11 is an article of any one of items 1 to 10, wherein the first PVA-containing layer contains at least one cross-linking agent selected from the group consisting of a silane, a multi-functional aldehyde, and an acid.

Item 12 is an article of any one of items 1 to 11, wherein the first PVA-containing layer contains at least one cross-linking agent selected from the group consisting of tetraethoxysilane, melamine formaldehyde, and boric acid.

Item 13 is an article of any one of items 1 to 10, further including one or more second silica layers disposed directly adjacent to the first PVA-containing layer or to the second PVA-containing layer.

Item 14 is an article of any one of items 1 to 12, further including a second silica layer that is an outermost layer of the multilayer coating.

Item 15 is an article of item 13 or item 14, wherein the second silica layer comprises a plurality of acid-sintered interconnected silica nanoparticles arranged to form a continuous three-dimensional porous network.

Item 16 is an article of any one of items 13 to 15, wherein the second silica layer further comprises PVA.

Item 17 is an article of any one of items 3 to 5, wherein the one or more second PVA-containing layers further contain a plurality of silica nanoparticles.

Item 18 is an article of any one of items 1 to 17, wherein the silica nanoparticles have average particle diameters up to 500 nanometers.

Item 19 is an article of item 7, wherein the weight ratio of a first distribution of silica nanoparticles to a second distribution of silica nanoparticles is in a range from 20:80 to 80:20.

Item 20 is an article of any one of items 1 to 19, wherein the first silica layer further contains a tetraalkoxysilane.

Item 21 is an article of any one of items 1 to 20, wherein the first silica layer further contains a surfactant.

Item 22 is an article of any one of items 1 to 21, wherein the silica nanoparticles comprise acicular silica particles.

Item 23 is an article of any one of items 1 to 22, wherein the substrate is at least one of a polymeric film, a polymeric sheet, a molded polymeric part, a metal, paper, a UV mirror, a UV stable substrate, a glass substrate, a mirror, a display, a window, or a release liner.

Item 24 is an article of any one of items 1 to 23, wherein the substrate comprises polyethylene terephthalate (PET).

Item 25 is a method of making an article, the method including (a) providing a substrate and (b) attaching a multilayer coating to a surface of the substrate. The attaching includes (i) forming a first silica layer that is a primer layer of the multilayer coating directly attached to the substrate, and (ii) forming a first PVA-containing layer directly adjacent to the first silica layer, the first PVA-containing layer comprising between 10 weight percent and 100 weight percent PVA. The first silica layer comprises a plurality of acid-sintered interconnected silica nanoparticles arranged to form a continuous three-dimensional porous network.

Item 26 is a method of item 25, further including forming a second PVA-containing layer, the second PVA layer disposed adjacent to the first PVA-containing layer.

Item 27 is a method of item 25 or item 26, wherein the first PVA-containing layer further includes a plurality of silica nanoparticles.

Item 28 is a method of any one of items 25 to 27, wherein forming the first silica layer includes preparing a dispersion containing the silica nanoparticles acidified with an acid having a pKa less than 3.5 to a pH in a range of 2 to 5, coating the dispersion on the substrate, and drying the coating to form the plurality of acid-sintered silica nanoparticles.

Item 29 is a method of any one of items 25 to 28, wherein the first silica layer further includes PVA.

Item 30 is a method of any one of items 25 to 29, wherein the first PVA-containing layer includes a silane-modified PVA.

Item 31 is a method of item 26, further including crosslinking the second PVA-containing layer.

Item 32 is a method of item 31, wherein the crosslinking is performed using a crosslinking agent selected from the group consisting of a silane, a multi-functional aldehyde, and an acid.

Item 33 is a method of item 31 or item 32, wherein the crosslinking is performed using a crosslinking agent selected from the group consisting of tetraethoxysilane, melamine formaldehyde, and boric acid.

Item 34 is a method of item 26, wherein the second PVA layer further contains a plurality of silica nanoparticles.

Item 35 is a method of any one of items 25 to 34, wherein the silica nanoparticles have average particle diameters up to 500 nanometers.

Item 36 is a method of any one of items 25 to 35, wherein the first silica layer further contains a tetraalkoxysilane.

Item 37 is a method of any one of items 25 to 36, wherein the first silica layer further contains a surfactant.

Item 38 is a method of any one of items 25 to 37, further including forming a second silica layer that is an outermost layer of the multilayer coating.

Item 39 is a method of item 38, wherein the second silica layer is attached directly to the first PVA-containing layer.

Item 40 is a method of item 28, wherein the dispersion containing the silica nanoparticles comprises silica nanoparticles having a bi-modal size distribution.

Item 41 is a method of item 28 or item 40, wherein the dispersion containing the silica nanoparticles comprises silica nanoparticles having average particle diameters up to 20 nanometers.

Item 42 is a method of item 25, the method including (a) flowing a first fluid down a first slide surface of a slide coater, the first fluid comprising a plurality of acidified silica nanoparticles and corresponding to the first silica layer; (b) flowing a second fluid down a second slide surface of the slide coater to form a second fluid layer over the first slide surface, the second fluid comprising PVA and corresponding to the first PVA-containing layer, and (c) coating the substrate with the first and second fluids to form a multilayer fluid coating, the first fluid being the lowermost fluid of the multilayer fluid coating and coated directly onto the substrate by the slide coater.

Item 43 is a method of item 42, further comprising (d) heating the multilayer fluid coating to form the first silica layer from the first fluid layer and to form the first PVA-containing layer from the second fluid layer.

Item 44 is a method of item 42, further including flowing a third fluid down a third slide surface of a slide coater, the third fluid including a plurality of acidified sintered silica nanoparticles and the third fluid being the uppermost fluid of the multilayer fluid coating coated onto the substrate by the slide coater.

Item 45 is a method of item 44, further including flowing a fourth fluid down a fourth slide surface of the slide coater to form a fourth fluid layer over the first slide surface, the fourth fluid located below the third fluid.

Item 46 is a method of any one of items 42 to 45, wherein the first fluid further contains PVA.

Item 47 is a method of any one of items 42 to 46, wherein the second fluid further contains a plurality of silica nanoparticles.

Item 48 is a method of item 42, further including crosslinking of the PVA, the crosslinking performed using a crosslinking agent selected from the group consisting of a silane, a multi-functional aldehyde, and an acid.

Item 49 is a method of item 39, wherein the fourth fluid comprises PVA, a plurality of silica nanoparticles, or combinations thereof.

Item 50 is a method of any one of items 42 to 49, wherein the first fluid further contains a tetraalkoxysilane.

Item 51 is a method of any one of items 42 to 50, wherein the first fluid further contains a surfactant.

Item 52 is a method of any one of items 42 to 51, wherein the PVA comprises a silane-modified PVA.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

"PET" was polyethylene terephthalate (50 micrometer (μm) or 100 μm-thick) film prepared from SCOTCHPAR available from 3M Company, St. Paul, Minn.

"NALCO 2329K" refers to a trade designation for an aqueous colloidal spherical silica dispersion with 40.4 weight percent solids (nominally 40 weight percent solids), commercially available from NALCO Chemical Company, Naperville, Ill. The average particle size was approximately 75 nanometers.

"SILCO LI-0830" refers to a trade designation for an aqueous colloidal spherical silica dispersion with 30.5 weight percent solids (nominally 30 weight percent solids and average particle size of approximately 8 nanometers) obtained from SILCO International LLC, Portland, Oreg.

"SILCO EM-3530" refers to a trade designation for an aqueous colloidal spherical silica dispersion with 35.6 weight percent solids (nominally 30 weight percent solids and average particle size of approximately 35 nanometers) obtained from SILCO International LLC, Portland, Oreg.

"POLYSTEP B430-S" refers to a trade designation for an aqueous surfactant solution with 29 weight percent solids, commercially available from Stepan Company, Northfield, Ill.

"KURARAY R-2105" refers to a trade designation for a silane modified polyvinyl alcohol polymer commercially available from Kuraray Co. LTD, Japan.

"SNOWTEX ST-O-40" refers to a trade designation for an aqueous colloidal spherical silica dispersion with 40.8 weight percent solids (nominally 41% solids and average particle size of approximately 40 nm) obtained from Nissan Chemical Company, Pasadena, Tex.

"TEOS" was tetraethoxysilane obtained from Alfa Aesar, Ward Hill, Mass.

Test Methods

Method for Abrasion Testing

A TABER 5155 rotary platform abrasion tester (obtained from Taber Industries of North Tonawanda, N.Y.) was fitted with a CS-10F Calibrase wheel (obtained from Taber Industries, North Tonawanda, N.Y.). The samples from the Examples and Comparative Example described below were abraded for 500 cycles with a load of 500 grams following ASTM D0460. Transmission and haze measurements were performed using a BYK-Garner Haze-Gard Plus (obtained from BYK-Gardner of Columbia, Md.) fitted with a Taber wheel sample holder.

Method for Oscillating Sand Testing

Samples prepared according to the Examples and Comparative Example described below were die cut using a Circle Buttonmaker 1806761 (obtained from AccuCut, Omaha, Nebr.) and a die cutter (obtained from AccuCut, Omaha, Nebr.). The initial gloss, transmission and haze of the samples were measured using a Micro-Tri-Gloss 4528 gloss meter (obtained from BYK-Gardner of Columbia, Md., and a BYK-Garner Haze-Gard Plus (obtained from BYK-Gardner of Columbia, Md.). The sample was then placed in the lid of a Speedmixer cup (obtained from FlakTek Inc, Landrum, S.C.) with the uncoated side pressed against the lid. Sand (50 g, ASTM C-190 sand) was added to the testing container. Samples were placed in a shaker upside down (Shaker model 3500, obtained from VWR International, Radnor, Pa.) such that the sand was on top of the samples. The samples oscillated on the shaker for 60 minutes at 450 rpm. Upon completion, the samples were rinsed under a stream of deionized water for 10 seconds before drying with compressed air. If the samples appeared smudged, the samples were re-cleaned. The sample was then removed from the cup and the final gloss, transmission and haze data was collected.

Example 1 (E1)

15 kilogram (kg) batches of coating solutions for layers 1-2 were prepared by combining the following ingredients in the order listed: colloidal silica (Snowtex ST-O-40, Nissan Chemicals, 41.1% solids in water), deionized water, surfactant (Polystep B-430S, Stepan Inc., 29% solids in water), PVA solution (Kuraray Poval R2105, 10% solids in water), nitric acid (3.0 M), and TEOS. Table 1 below lists the amounts of each ingredient. After the surfactant, all ingredients were added slowly while rapidly mixing the solution with an overhead stirrer equipped with a propeller-style blade. The nitric acid was added until the pH reached 4. Following the addition of TEOS, the resulting suspension was stirred for 13 hours during which time the TEOS gradually dissolved and the solution haze cleared somewhat. Additional nitric acid (3.0 M) was then added until the pH reached 2.5.

TABLE 1

|  | Layer 1 (1st silica layer) | Layer 2 (1st PVA-containing layer) |
|---|---|---|
| Snowtex ST-O-40 (41.1% solids) | 3.14 kg | 1.83 kg |
| Deionized Water | 10.14 kg | 7.03 kg |
| Polystep B-430S (29% solids) | 2.1 g | 3.1 g |
| Kuraray R-2105 (10% solids) | 1.68 kg | 6.00 kg |
| 3.0M nitric acid (first addition) | 3.0 g | 15.0 g |
| TEOS | 42.0 g | 150.0 g |
| 3.0M nitric acid (second addition) | 16.0 g | 33.0 g |

The two layers were coated on 8 inch wide (20.32 cm) PET film via slide coating in a roll to roll process running at 36 feet (11 m) per minute. The film was passed through 30 feet (9.1 m) of oven at 180° F. (82.2° C.) to dry and cure.

Table 2 below reports the optical properties and the abrasion properties for the two layer sample.

TABLE 2

| Dry layer Thickness (μm) | | | Optical Properties | | | Taber Abrasion | Falling Sand |
|---|---|---|---|---|---|---|---|
| layer 1 | layer 2 | Total | Haze | Clarity | Transmission | ΔHaze | ΔHaze |
| 0.45 | 2.67 | 3.11 | 1.60 | 99.70 | 91.00 | 3.46 | 11.60 |

Example 2 (E2)

A 10 wt. % solution of KURARAY R-2105 in water was prepared by heating a mixture of water and solid KURARAY R-2105 at 90° C. overnight. Then 15 kg batches of three coating solutions for layers 1-3 were prepared by combining the following ingredients in the order listed: colloidal silica (SNOWTEX ST-O-40), de-ionized water, surfactant (POLYSTEP B-430S), the 10 wt. % KURARAY R-2105 solution prepared as described above, nitric acid (3.0 M), and TEOS. The amounts of each ingredient used are reported in Table 3, below. After adding the surfactant (POLYSTEP B-430S), all ingredients were added slowly while rapidly mixing the solution with an overhead stirrer equipped with a propeller-style blade. The nitric acid was added until the pH reached 4. Following the addition of TEOS, the resulting suspension was stirred for 13 hours during which time the TEOS gradually dissolved and the solution haze somewhat cleared. Additional nitric acid (3.0 M) was then added until the pH reached 2.5.

TABLE 3

|  | Layer 1 (1st silica layer) | Layer 2 (1st PVA-containing layer) | Layer 3 |
|---|---|---|---|
| SNOWTEX ST-O-40 (41.1% solids) | 3.14 kg | 1.83 kg | 1.53 kg |
| Deionized Water | 10.14 kg | 7.03 kg | 11.25 kg |
| POLYSTEP B-430S (29% solids) | 2.1 g | 3.1 g | 4.0 g |
| KURARAY R-2105 (10% solids) | 1.68 kg | 6.00 kg | 2.16 kg |
| 3.0M nitric acid (first addition) | 3.0 g | 15.0 g | 7.0 g |
| TEOS | 42.0 g | 150.0 g | 54.0 g |
| 3.0M nitric acid (second addition) | 16.0 g | 33.0 g | 12.0 g |

A three layer coating was then deposited on an 8 inch (20.32 cm) wide PET substrate in a single step via slide coating in a roll to roll process running at 100 feet (30.5 m) per minute. After coating, the web speed was slowed to 10 feet (3.0 m) per minute, and the coated substrate was passed through 30 feet (9.1 m) of oven at 180° F. (82.2° C.) to dry and cure. Table 4, below, summarizes the relevant coating parameters used for each layer.

TABLE 4

|  | Wt. % solids | Flow rate (cc/min) | Wet Thickness (μm) | Dry Thickness (μm) |
|---|---|---|---|---|
| Layer 1 | 10% | 35 | 2.8 | .28 |
| Layer 2 | 10% | 245 | 24.3 | 2.43 |
| Layer 3 | 6% | 70 | 5.7 | 0.34 |
| Total layers 1-3 | — | 350 | 32.8 | 3.05 |

The durability of the coated film was assessed using the abrasion test and oscillating sand test. The results are reported in Table 5, below.

TABLE 5

| Initial Haze | Haze after Taber Abrasion | Taber Delta Haze | Haze after Oscillating Sand | Oscillating Sand Delta Haze |
|---|---|---|---|---|
| 1.46% | 4.83% | 3.37% | 2.40% | 0.94% |

Example 3 (E3)

15 kg batches of coating solutions for layers 1-3 were prepared by combining the following ingredients in the order listed: colloidal silica (Snowtex ST-O-40, Nissan Chemicals, 41.1% solids in water), deionized water, surfactant (Polystep B-430S, Stepan Inc., 29% solids in water), PVA solution (Kuraray Poval R2105, 10% solids in water), nitric acid (3.0 M), and TEOS. Table 6 below lists the amounts of each ingredient. After the surfactant, all ingredients were added slowly while rapidly mixing the solution with an overhead stirrer equipped with a propeller-style blade. The nitric acid was added until the pH reached 4. Following the addition of TEOS, the resulting suspension was stirred for 13 hours during which time the TEOS gradually dissolved and the solution haze cleared somewhat. Additional nitric acid (3.0 M) was then added until the pH reached 2.5.

TABLE 6

|  | Layer 1 (1st silica layer) | Layer 2 (1st PVA-containing layer) | Layer 3 |
|---|---|---|---|
| Snowtex ST-O-40 (41.1% solids) | 3.14 kg | 1.83 kg | 1.53 kg |
| Deionized Water | 10.14 kg | 7.03 kg | 11.25 kg |
| Polystep B-430S (29% solids) | 2.1 g | 3.1 g | 4.0 g |
| Kuraray R-2105 (10% solids) | 1.68 kg | 6.00 kg | 2.16 kg |
| 3.0M nitric acid (first addition) | 3.0 g | 15.0 g | 7.0 g |
| TEOS | 42.0 g | 150.0 g | 54.0 g |
| 3.0M nitric acid (second addition) | 16.0 g | 33.0 g | 12.0 g |

12 kg of coating solution for layer 4 was prepared by mixing the following in the order listed: 378 g of Silco EM-3530K (30.5% silica in water), 94.4 g of Silco LI-0830 (30.5% silica in water), 11.53 kg of deionized water, 6.6 g of surfactant (Polystep B-430S, Stepan Inc., 29% solids in water), and 37.5 g of nitric acid (3.0 M). The nitric acid was added slowly with stirring until the pH reached 2.5.

The four layers were coated on 8 inch (20.32 cm) wide PET film via slide coating in a roll to roll process running at 36 feet (11 m) per minute. The film was passed through 30 feet (11 m) of oven at 180° F. (82.2° C.) to dry and cure. Table 7 below reports the optical properties and the abrasion properties for the four layer sample.

TABLE 7

| Dry layer Thickness (μm) | | | | | Optical Properties | | | Taber Abrasion | Falling Sand |
|---|---|---|---|---|---|---|---|---|---|
| layer 1 | layer 2 | layer 3 | layer 4 | Total | Haze | Clarity | Transmission | ΔHaze | ΔHaze |
| 0.27 | 1.59 | 0.31 | 0.44 | 2.62 | 1.60 | 99.70 | 91.00 | 3.46 | 11.60 |

Comparative Example 1 (CE1)

13 kg of coating solution for a single layer was prepared by mixing the following in the order listed: 193 g of Nalco 2329K (40.4 wt %), 110 g of Silco EM-3530 (35.6% silica in water), 31 g of Silco LI-0830 (30.5% silica in water), 12.66 kg of deionized water, 7.2 g of surfactant (Polystep B-430S, Stepan Inc., 29% solids in water), and 37.5 g of nitric acid (3.0 M). The nitric acid was added slowly with stirring until the pH reached 2.5. The single layer was coated on 8 inch (20.32 cm) wide PET film via slide coating in a roll to roll process running at 36 feet (11 m) per minute. The film was passed through 30 feet (11 m) of oven at 180° F. (82.2° C.) to dry and cure. The final dry thickness of the coating was calculated to be 440 nm. The coating was tested for its optical properties and abrasion resistance. Three replicates of the coating sample were tested.

Table 8 below reports the optical properties and the abrasion properties for the single layer sample.

TABLE 8

| Dry layer Thickness (μm) | Optical Properties | | | Taber Abrasion | Falling Sand |
|---|---|---|---|---|---|
| layer 1 | Haze | Clarity | Transmission | ΔHaze | ΔHaze |
| 0.44 | 1.62 | 99.70 | 91.17 | 25.91 | 67.98 |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An article comprising:
   a. a substrate; and
   b. a multilayer coating attached to the substrate, the multilayer coating comprising
      i. a first silica layer that is a primer layer of the multilayer coating directly attached to the substrate, the first silica layer comprising a plurality of acid-sintered interconnected silica nanoparticles arranged to form a continuous three-dimensional porous network; and
      ii. a first PVA-containing layer disposed directly adjacent to the first silica layer, the first PVA-containing layer comprising between 10 weight percent and 100 weight percent poly(vinyl alcohol) (PVA).

2. The article of claim 1, wherein the first PVA-containing layer comprises between 0.5 weight percent and 90 weight percent silica nanoparticles.

3. The article of claim 1 further comprising a second PVA-containing layer disposed adjacent to the first PVA-containing layer, the second PVA-containing comprising between 10 weight percent and 100 weight percent PVA.

4. The article of claim 3, wherein at least one of the first PVA-containing layer and the second PVA-containing layer comprises crosslinked PVA.

5. The article of claim 3, wherein the second PVA-containing layer further comprises a plurality of silica nanoparticles.

6. The article of claim 3, further comprising a second silica layer that is an outermost layer of the multilayer coating, wherein the second silica layer is attached directly to the second PVA-containing layer.

7. The article of claim 1, wherein the first silica layer further comprises PVA.

8. The article of claim 1, wherein the plurality of acid-sintered interconnected silica nanoparticles are formed from a dispersion comprising the silica nanoparticles acidified with an acid having a pKa less than 3.5 to a pH in a range of 2 to 5.

9. The article of claim 1, wherein the first PVA-containing layer comprises a silane-modified PVA.

10. The article of claim 1, further comprising a second silica layer that is an outermost layer of the multilayer coating.

11. The article of claim 10, wherein the second silica layer comprises a plurality of acid-sintered interconnected silica nanoparticles arranged to form a continuous three-dimensional porous network.

12. The article of claim 10, wherein the second silica layer further comprises PVA.

13. A method of making an article, the method comprising:
   a. providing a substrate;
   b. attaching a multilayer coating to a surface of the substrate, the attaching comprising
      i. forming a first silica layer that is a primer layer of the multilayer coating directly attached to the substrate, the first silica layer comprising a plurality of acid-sintered interconnected silica nanoparticles arranged to form a continuous three-dimensional porous network; and
      ii. forming a first PVA-containing layer directly adjacent to the first silica layer, the first PVA-containing layer comprising between 10 weight percent and 100 weight percent PVA;

wherein the forming of the first silica layer and the forming of the first PVA-containing layer comprises:
A. flowing a first fluid down a first slide surface of a slide coater, the first fluid comprising a plurality of acidified silica nanoparticles and corresponding to the first silica layer;
B. flowing a second fluid down a second slide surface of the slide coater to form a second fluid layer over the first slide surface, the second fluid comprising PVA and corresponding to the first PVA-containing layer; and
C. coating the substrate with the first fluid and the second fluid, to form a multilayer fluid coating, the first fluid being the lowermost fluid of the multilayer fluid coating and coated directly onto the substrate by the slide coater.

14. The method of claim 13, further comprising forming a second silica layer that is an outermost layer of the multilayer coating.

15. The method of claim 13, wherein the first PVA-containing layer further comprises a plurality of silica nanoparticles.

16. The method of claim 13, wherein forming the first silica layer comprises preparing a dispersion containing the silica nanoparticles acidified with an acid having a pKa less than 3.5 to a pH in a range of 2 to 5, coating the dispersion on the substrate, and drying the coating to form the plurality of acid-sintered silica nanoparticles.

17. The method of claim 16, wherein the first silica layer further comprises PVA.

18. The method of claim 17, wherein the first PVA-containing layer comprises a silane-modified PVA.

19. The method of claim 13, further comprising flowing a third fluid down a third slide surface of a slide coater, the third fluid comprising a plurality of acidified sintered silica nanoparticles and the third fluid being the uppermost fluid of the multilayer fluid coating coated onto the substrate by the slide coater.

20. The method of claim 13, further comprising cross-linking the PVA of the second fluid.

* * * * *